Figure 1:
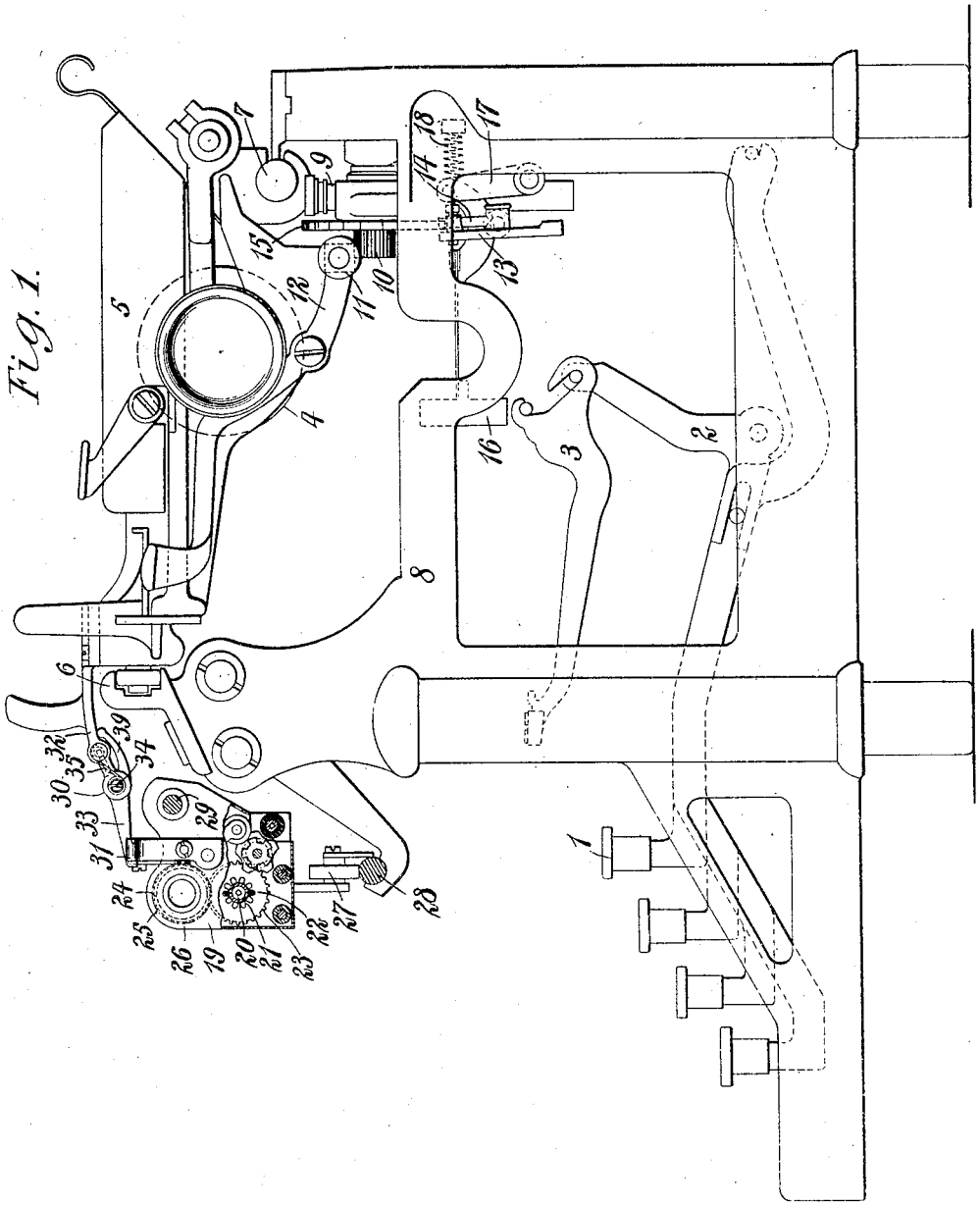

G. O. DEGENER.
COMBINED TYPE WRITING AND COMPUTING MACHINE.
APPLICATION FILED SEPT. 26, 1911.

1,149,555.

Patented Aug. 10, 1915.
3 SHEETS—SHEET 1.

Witnesses:
F. D. Sweet
J. A. Brophy

Inventor:
Gustave O. Degener
By B. L. Stickney
Attorney.

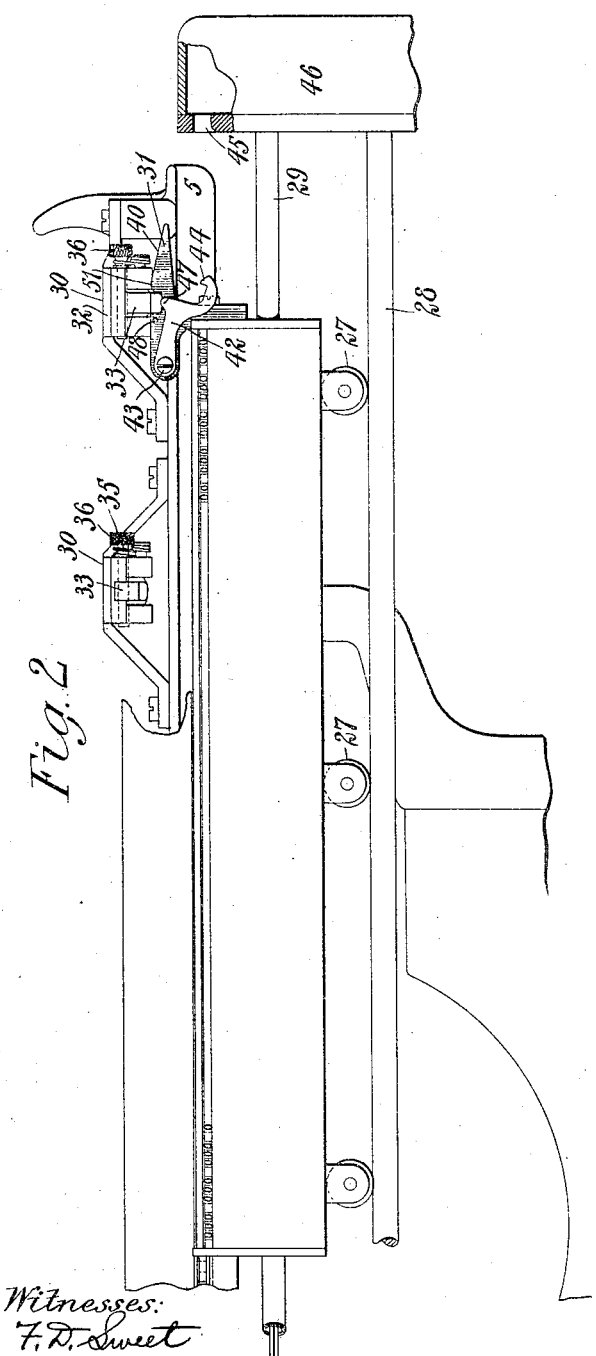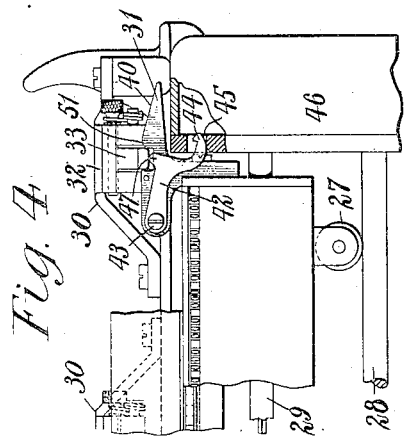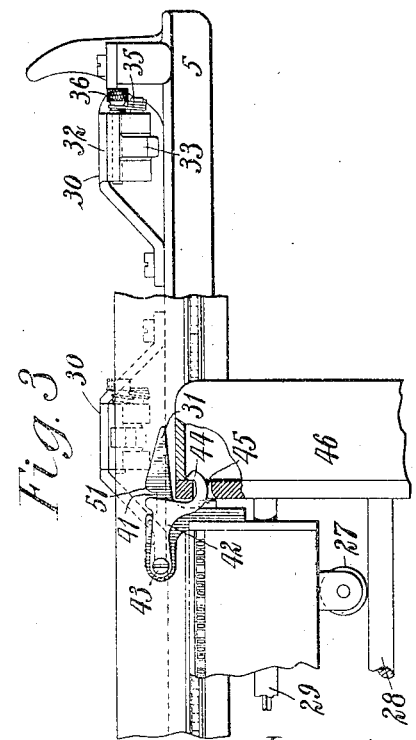

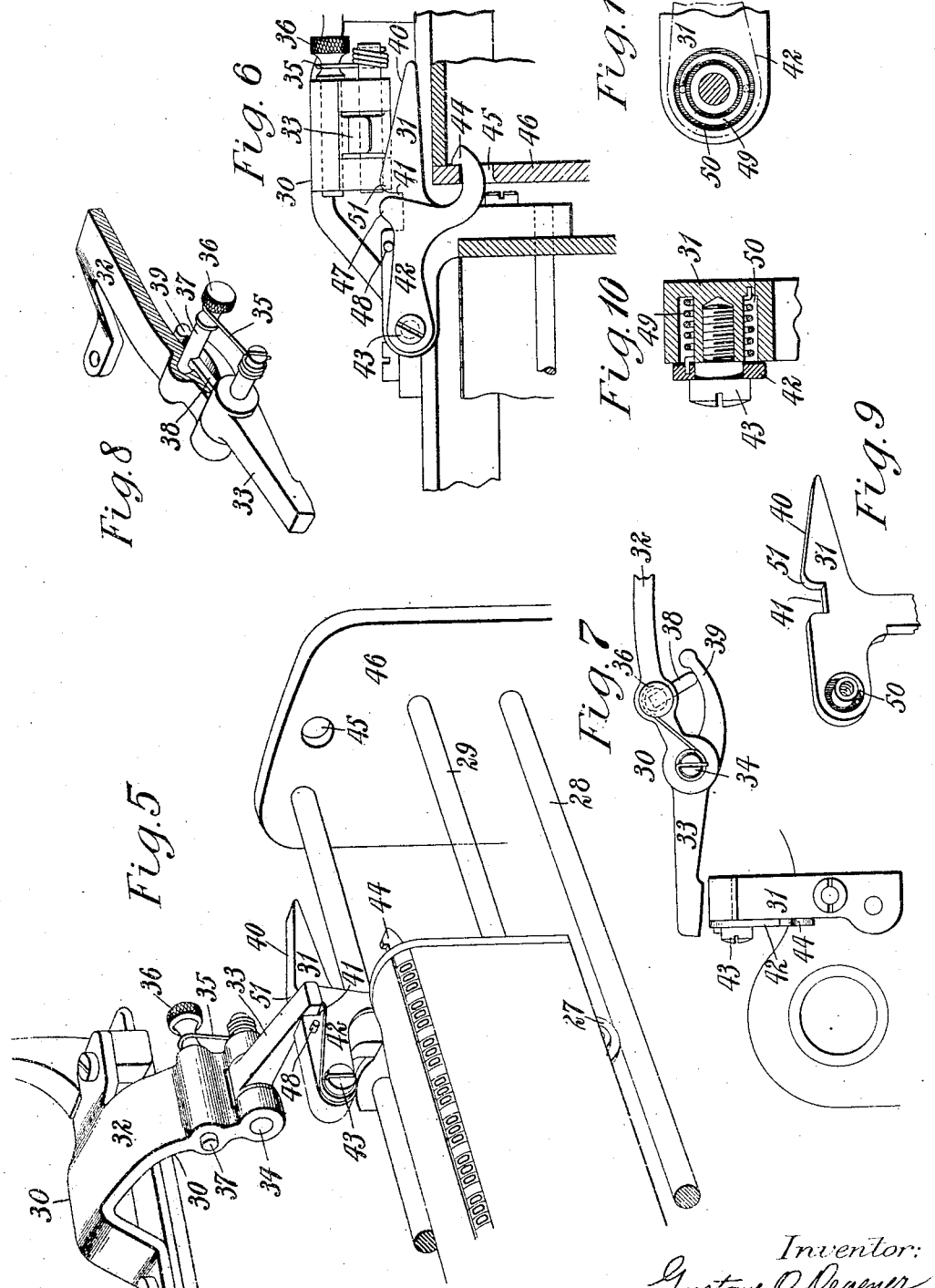

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,149,555.

Specification of Letters Patent.

Patented Aug. 10, 1915.

Application filed September 26, 1911. Serial No. 651,389.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to combined typewriting and computing machines, and more especially to means for coupling the traveling element or carriage of the computing mechanism so as to move concomitantly with the carriage of the typewriting mechanism, and so that a computing head much shorter than the typewriter carriage can be used, without the necessity of having the computing mechanism connected to the typewriter carriage during the entire run of the latter.

A coupler is provided between the movable or traveling element of the computing mechanism and the carriage of the typewriting mechanism, whereby the carriage can pick up the computing element at any predetermined point, enabling the computing mechanism to be brought in play at any point in the typewritten line, giving a range of variable positions which is valuable for use on a long carriage, the use of very long driving shafts, etc., for the computing mechanism being rendered unnecessary.

The improvement is shown in connection with a computing mechanism of the type in which a master wheel is given a rotation of variable extent at each actuation of a numeral key, depending on the particular key actuated. This movement is transmitted successively to a series of computing wheels with which the master wheel is brought in coöperation step by step by the movement of the typewriter carriage. For this purpose the typewriter carriage is provided with one or more pick-ups or couplers any one of which may be arranged so as to engage a catch on the computing carriage, which in this instance is shown to be the casing carrying the series of computing wheels, and therefore carry this carriage along with the typewriter carriage.

A lock normally holds the computing carriage stationary, but is automatically released. The computing carriage disengages itself from the coupler on the return movement of the typewriter carriage.

Other features and advantages will hereinafter appear.

Referring to the drawings, Figure 1 is a side view in elevation, with parts omitted for the sake of simplicity and with parts broken away to show the underlying structure. Fig. 2 is a fragmentary front view in elevation, with parts broken away to disclose the elements lying beneath the same, and showing the lock disconnected from the end plate of the machine, and with one of the pick-ups in engagement with the catch carrying the movable element of the computing mechanism along with the carriage. Fig. 3 is a view similar to Fig. 4, showing the lock secured to the end plate of the machine holding the movable element of the computing mechanism stationary and all of the pick-ups disconnected from the catch. Fig. 4 is a view similar to Figs. 2 and 3, showing one of the pick-ups in engagement with the catch, either in the act of picking up the movable element of the computing mechanism, or in the act of being disengaged from the movable element of the computing mechanism. Fig. 5 is a fragmentary perspective view showing the parts in the position illustrated in Fig. 2. Fig. 6 is an enlarged fragmentary vertical section showing one of the pick-ups adjusted by its control to a position in which it will not engage with the catch, and thus be incapable of connecting the movable element of the computing mechanism with the carriage. Fig. 7 is a fragmentary side view in elevation, showing the parts in the position illustrated in Fig. 6. Fig. 8 is a fragmentary perspective view of one of the pick-ups, showing parts in section to disclose the structure of the control for regulating the active and inactive position of the latch of the pick up. Fig. 9 is a fragmentary perspective view of the catch on the movable element of the computing mechanism. Figs. 10 and 11 are detail views, showing the connection of the lock with the catch.

The invention is shown as adapted to an Underwood-Wright combined computing and typewriting machine. Numeral keys 1 act through sub-levers 2 to throw type-bars 3 against the front side of a platen 4 on a carriage 5. The carriage 5 is supported in the usual manner on tracks 6 and 7, so as to be capable of moving along a frame 8 under the pull of a spring barrel 9. The carriage is under the control of a letter-feeding pinion 10 engaging a rack 11, mounted on the carriage 5 by means of pivoted arms 12.

The movement of the carriage may be controlled in the usual manner by means of escapement pawls 13 and 14, which engage an escapement wheel 15 connected to the pinion 10, and which are operated by a universal bar 16 lying in the path of the typebars 3. The return of the escapement pawls 13 and 14 and the universal bar 16 is obtained in the usual manner by a member 17 normally pressed in one direction by means of a spring 18.

The computing mechanism, indicated at 19, is of a type in which a member 20, which may be termed "the master wheel", is given a predetermined amount of rotation at each actuation of a numeral key, which amount depends on the particular numeral key struck. The master wheel 20 is provided with teeth which project outwardly, so as to engage between coöperating teeth 21 which form internal gears 22. The gears 22 are arranged in a series side by side, and are also provided with external teeth 23 so as to form external gears, which mesh with corresponding gears 24 provided upon computing or numeral wheels 25. In this instance the master wheel 20 is shown as remaining stationary, while the casing, indicated at 26, which carries the gears 22 and the computing wheels 25, is carried along with the carriage 5, so as to bring the master wheel 20 successively into coöperation with each of the gears 22. The casing or carriage 26 is provided with wheels 27 which run on a track 28, and the carriage is further supported by means of a rod or track 29 which extends through suitable bearings provided in the casing or carriage 26.

In order to obtain the desired movement of the carriage 26 which, with the parts carried thereby, forms the traveling element of the computing mechanism, there are provided on the carriage 5 one or more pick-ups 30. In this instance two are shown, but the number is not limited. Each of these pick-ups may be of a construction suitable to engage a catch 31 provided on the computing carriage 26, and may comprise a bracket 32 secured to the carriage 5 and provided at its front end with a latch or coupler 33 pivotally mounted at 34 on the bracket 32.

The latch 33 is normally pressed downwardly by a spring 35, so as to be in position to engage the catch 31. The latter has a beveled or inclined surface 40, upon which the latch 33 rides during the letter-feeding movement of the carriage, so that the latch can drop into a notched seat 41 provided in the catch 31, thereby automatically coupling the carriages.

When the latch 33 drops into said seat 41, the spring 35 forces it downward to an extent to release a lock 42 which normally holds the computing carriage 26 stationary, so as to permit the typewriter carriage 5 to carry the computing carriage 26 along. The lock may be pivoted at 43 upon the catch 31, and is provided at one end with a hook 44, which is adapted to engage in an opening 45 provided in one of the end plates 46 of the machine, so as to engage on the rear side thereof, as indicated in Fig. 6, to lock the computing carriage 26 in its initial or normal position. The lock 42 may be provided with a projection or enlargement 47, to occupy normally a position in register with the notched seat 41, but standing higher than said seat, in position to be engaged and depressed by coupler or latch 33. The lock 42 may be pressed up against a stop pin 48, by a spiral returning spring 49, arranged in socket 50 in catch 31.

The master wheel 20 is given a rotation at the stroke of each numeral key 1 to an extent corresponding to the particular numeral key struck. It is necessary that this rotation shall be imparted successively to the individual gears or disks 22 as the successive numerals are struck. Hence the movement of the computing carriage can proceed concomitantly with the movement of the typewriter carriage, which spaces automatically at the striking of each numeral key. The pick-ups 30 may be so set that the computing carriage will be automatically picked up at the instant of striking a numeral key for the purpose of computing.

As the pick-up or coupler approaches the catch 31, it will ride up along the bevel 40, and then drop into notch 41, the spring 35 acting on the catch 31 also to depress the lock 42 sufficiently to permit the lock or hook 44 to disengage from the opening 45. Then the typewriter carriage 5 will carry along the carriage 26, by means of the coupler or catch 31, step by step, so that the master wheel 20 is brought successively into coöperation with the several computing gears or disks 22, and thus will operate successively the several computing wheels 25 each to an extent corresponding to the particular numeral key struck.

The lower part of the opening 45 is slightly beveled at its entrance side, Fig. 6, so that when the lock 42 enters the opening 45 at the end of the return motion of the carriage, it will be automatically cammed up into the position shown in Fig. 4, so as to raise the latch 33 to the position indicated in Fig. 4, and in fact to such an extent that a further movement of the carriage 5 will automatically force the latch 33 out of the seat 41. The right-hand edge of the notch 41 is cut away, as indicated at 51, for this purpose. The movement of the carriage 5 causes the latch 33 to ride on the cut-away or beveled corner 51 of the catch 31, so that it will automatically be disengaged from connection with the movable element of the computing mechanism. The lock 42 will then rise to its fullest extent under the influence of the spring 49 to the position indicated in Fig. 6, where it will positively lock or anchor the computing carriage in its initial position; the plate 46 serving to prevent further movement of the computing carriage toward the right. It will thus be seen that the lock 42 forms a positioner for determining the initial location of the computing carriage, and also forms a disconnector for disconnecting the latch 33 from the catch 31.

The opposite corner of the notched seat 41 need not be cut away to the same extent, so that when the latch 33 comes in engagement with the catch 31, it will be securely connected to the catch 31 and carry the computing carriage along with it.

It may be desirable to throw one or more of the pick-ups 30 out of operation. If such is the case, a cast-off device 36 may be operated to raise the front end of the latch to such a height that it will be incapable of properly engaging the catch 31. This device is shown in the form of a pin 37 rotatably mounted in the bracket 32 and provided with a finger 38 to engage a tail 39 provided on the latch 33 so as to depress said tail 39 and raise the front end of the latch 33. The position of the latch and cast-off device in the inactive condition of the pick-up is shown in Fig. 7. It will be seen from this view that the end of the finger is automatically thrown beyond the pivotal center of the pin 37, so that the tension of the spring 35 will lock the parts in the inactive position of the latch.

If it is desired to throw one or all of the pick-ups 30 out of operation, it is merely necessary to rotate the cast-off device 36 from the position indicated in Fig. 8 to the position indicated in Fig. 7, when the latch or latches 33 will be raised to such a height that they cannot engage the catch 31, and thus will be unable to carry the computing carriage along with the typewriter carriage. This feature can be used to determine the point in the movement of the typewriter carriage at which the computing carriage will be picked up. It can also be used to entirely disconnect the computing mechanism from the carriage so that the machine can be used solely for typewriting when desired.

Thus it will be seen that the computing carriage 26 is normally stationary during a part of the run of the carriage in letter-feeding direction, and at the appointed time is connected to the typewriter carriage, and thereafter travels therewith, and that the computing carriage is also returned to normal position while the typewriter carriage is returning; the return movement of the typewriter carriage being completed while the computing carriage remains stationary and anchored to the machine.

One of the advantages of this structure is found in machines in which very wide typewriter carriages are used, and in which it would be necessary to provide drive shafts of extraordinary length for the master wheel and the tens-carrying mechanism employed in said Underwood-Wright machine. That is, these drive shafts correspond in length to the width of the paper carriage, and they would need to be of very great length in the case of an extra wide carriage, and the mechanism for controlling said shafts would have to be placed very far to one side of the main frame of the typewriting machine; all of which would be an objection. By using the present invention, drive shafts of moderate length may be employed for the master wheel 20, and for the tens-carrying mechanism which is used in said Underwood-Wright machine, without, however, limiting the width of the carriage since a line perhaps fifteen or twenty inches long can be written upon the carriage before coupling up the computing carriage or adding head 26.

The two coupling devices on the carriage may be used in the following manner: The typewriter carriage 5 during the writing operation feeds toward the left at Fig. 2, and the first coupling device 33 may, at the proper time, connect the typewriter carriage to the computer carriage, whereupon they travel together, so that while a number is being written in a column on the work-sheet, it is also being computed in one zone or adding field on the computer. Then the user of the machine may manually release the computing carriage from the typewriter carriage, and then may adjust the typewriter carriage to a place for writing in the next or right-hand column on the page. Then he may connect the computer carriage to the other coupling device on the typewriter carriage 5, and then proceed to write a number in said right-hand column, which number will be also computed on the computing head, although not in the same zone as was employed in adding the number that was written in the left-hand column on the work-sheet. These columns of figures will not overlap, because in passing from one column to the next, the typewriter carriage will be stepped along a sufficient number of spaces to prevent such overlapping. In fact, if overlapping did occur, it would be impossible to copy the totals onto the work-sheet, and the operator in laying out the columns should make note of this. The distance between the columns on the work-sheet may be greatly in excess of the distance or intervals between said zones on the computing head. Thus, in this and other ways, it will be seen that the device is of advantage in enabling computations to be performed by a compact computing device, in the several zones thereof, although the numbers so computed may be disposed at very great intervals across a wide work-sheet. The distance between the adding zone on the computer may be only one-half an inch or less, while the distance between the corresponding columns on the work-sheet may be eight or ten inches. This makes a relatively short adding carriage, to perform the work that would otherwise need an adding carriage of the same length as the typewriter carriage. Upon returning the typewriter carriage to begin a new line, the adding carriage will become automatically disconnected therefrom, and the typewriter carriage will complete its return movement, while the computing carriage remains stationary.

Variations may be resorted to within the scope of the invention, and portions of the improvements may be used without others.

Having thus described my invention, I claim:

1. The combination with a computing mechanism including a movable element, of a typewriting mechanism including a carriage, a catch on one of said members, a pick-up on the other of said members adapted to engage said catch at a predetermined point in the movement of said catch so as to cause said movable element and said carriage to move concomitantly, and a lock for holding said movable element stationary.

2. The combination with a computing mechanism including a movable element, of a typewriting mechanism including a carriage, a catch on one of said members, a pick-up on the other of said members adapted to engage said catch at a predetermined point in the movement of said catch so as to cause said movable element and said carriage to move concomitantly, and a lock for holding said movable element stationary; said lock acting to assist in disengaging said pick-up from said catch on locking said movable element in a stationary position.

3. The combination with a computing mechanism including a movable element, of a typewriting mechanism including a carriage, a catch on one of said members, a pick-up on the other of said members adapted to engage said catch at a predetermined point in the movement of said catch so as to cause said movable element and said carriage to move concomitantly, and a lock for holding said movable element stationary; said pick-up acting to unlock said lock on engaging said catch to permit the movement of said movable element.

4. The combination with a computing mechanism including a movable element, of a typewriting mechanism including a carriage, a catch on one of said members, a pick-up on the other of said members adapted to engage said catch at a predetermined point in the movement of said catch so as to cause said movable element and said carriage to move concomitantly, and a lock for holding said movable element stationary; said pick-up acting to unlock said lock on engaging said catch to permit the movement of said movable element; and said lock acting to assist in disengaging said pick-up from said catch on locking said movable element in a certain position.

5. The combination with a typewriting mechanism including a movable carriage, of a computing mechanism including a movable element, a pick-up on one of said movable members, and a catch on the other of said movable members, said pick-up including a bracket and a latch pivotally mounted on said bracket, a spring normally urging said latch into engagement with said catch when said latch and said catch are in juxtaposition to each other; said latch having a tail thereon, a finger engaging said tail to raise one end of said latch out of coöperative relation with respect to said catch, and manipulable means for adjusting said finger.

6. The combination with a computing mechanism including a movable element, of a typewriting mechanism including a movable element, a latch carried by one of said elements, a catch carried by the other of said elements adapted to engage said catch so that said elements will move concomitantly, a lock for securing one of said elements in a stationary position, and a plate having an opening therein adapted to coöperate with said lock.

7. The combination with a computing mechanism including a movable element, of a typewriting mechanism including a movable element, a latch carried by one of said elements, a catch carried by the other of said elements adapted to engage said catch so that said elements will move concomitantly, a lock for securing one of said elements in a stationary position, and a plate having an opening therein adapted to coöperate with said lock; said opening being beveled at one side so as to actuate said lock to release said latch.

8. The combination with a typewriting mechanism including a movable element, of a computing mechanism including a movable element, a latch carried by one of said elements, a catch carried by the other of said elements, a spring normally urging said latch to a position to engage said catch, a lock for one of said movable elements releasable by said latch, and a spring for said lock tending to force the same into a locking position.

9. The combination with a typewriting mechanism including a movable element, of a computing mechanism including a movable element, a latch carried by one of said elements, a catch carried by the other of said elements, a spring normally urging said latch to a position to engage said catch, a lock for one of said movable elements releasable by said latch, and a spring for said lock tending to force the same into a locking position; said first-mentioned spring being stronger than said second-mentioned spring.

10. The combination with a typewriting mechanism including a movable element, of a computing mechanism including a movable element, a latch carried by one of said elements, a catch carried by the other of said elements, a spring normally urging said latch to a position to engage said catch, a lock for one of said movable elements releasable by said latch, a spring for said lock tending to force the same into a locking position; said first-mentioned spring being stronger than said second-mentioned spring, and a plate having an opening therein cooperating with said lock and acting to cause the release of said latch from engagement with said catch.

11. The combination with a computing mechanism including a movable element, of a typewriting mechanism including a movable element, automatic means for connecting said elements to move together concomitantly after a predetermined movement of one of said elements, and automatic means for disconnecting said elements after a predetermined concomitant return movement of said elements; said last-mentioned means acting to lock one of said elements in a fixed position.

12. The combination with a traveling typewriter carriage, of a computing mechanism having two primary elements, to wit: a computing head of somewhat less length than the effective length of said carriage, and a master wheel for said computing head, one of said primary elements being arranged to travel relatively to the other, pick-up means for joining said traveling element to move with said carriage after a predetermined movement of said carriage, so as to compensate for the difference of effective length between said computing head and said carriage, said traveling element being stationary during the forward movement of said carriage before being picked up thereby, said pick-up means after once coming into play acting to carry said traveling element along with it during the remainder of the entire normal forward movement of said carriage, and a disconnector for freeing said traveling element from said carriage before said carriage has returned to its starting position.

13. The combination with a traveling typewriter carriage, of a computing mechanism having two primary elements, to wit: a computing head of somewhat less length than the effective length of said carriage, and a master wheel for said computing head, one of said primary elements being arranged to travel relatively to the other, pick-up means for joining said traveling element to move with said carriage after a predetermined movement of said carriage, so as to compensate for the difference of effective length between said computing head and said carriage, said traveling element being stationary during the forward movement of said carriage before being picked up thereby, said pick-up means after once coming into play acting to carry said traveling element along with it during the remainder of the entire normal forward movement of said carriage, and a positioner for determining the stopping point of said traveling element irrespective of the stopping point of said carriage.

14. The combination with a traveling typewriter carriage, of a computing mechanism having two primary elements, to wit: a computing head of somewhat less length than the effective length of said carriage, and a master wheel for said computing head, one of said primary elements being arranged to travel relatively to the other, pick-up means for joining said traveling element to move with said carriage after a predetermined movement of said carriage, so as to compensate for the difference of effective length between said computing head and said carriage, said pick-up means acting automatically at any one of a plurality of predetermined points to traverse the normally stationary traveling element during the remainder of the forward movement of said carriage, and means for disconnecting said traveling element from said carriage solely during the return movement of said traveling element with said carriage.

15. The combination with a computing mechanism, of a traveling carriage, said computing mechanism including a normally anchored traveling element, automatic means for releasing and selectively attaching said traveling element to said carriage at any one of a plurality of predetermined points in the travel of said carriage, and means for determining at which point said traveling element shall be attached to said carriage.

16. The combination with a typewriting mechanism including a carriage, of a computing mechanism including a carriage, a coupler for joining said computing carriage to said typewriter carriage to cause the latter to carry the former while both advancing and returning, a device for entirely disconnecting said carriages from each other at a predetermined point in the movement of the typewriter carriage, and means normally anchoring said computing carriage to the framework of the machine.

17. The combination with a typewriting mechanism including a carriage, of a computing mechanism including a carriage, a coupler for joining said computing carriage to said typewriter carriage to cause the latter to carry the former while both advancing and returning, a device for entirely disconnecting said carriages from each other at a predetermined point in the movement of the typewriter carriage, and means normally anchoring said computing carriage to the framework of the machine, means being connected to said coupler for automatically releasing the computing carriage from its anchorage as it is coupled to the typewriter carriage.

18. The combination with a typewriting mechanism including a carriage, of a computing mechanism including a carriage, a plurality of couplers each constructed to join said carriages, a spring for each coupler tending to make it effective, and means for silencing either coupler.

19. The combination with a typewriter carriage and a computing carriage, of a series of couplers for connecting them, means for silencing either coupler, means to act upon either coupler to disconnect the carriages from each other, means normally anchoring the computing carriage to the framework of the machine, and means associated with each coupler for automatically releasing the computing carriage from its anchorage when it is coupled to the typewriter carriage.

20. The combination with a typewriter carriage, of a relatively short computing carriage normally anchored against traveling, and means effective at a certain point in the travel of the typewriter carriage for releasing the computing carriage from its anchorage, and coupling it to the typewriter carriage.

21. The combination with a typewriter carriage, of a relatively short computing carriage normally anchored against traveling, means effective at a certain point in the travel of the typewriter carriage for releasing the computing carriage from its anchorage, and coupling it to the typewriter carriage, and means effective upon the return movement of the typewriter carriage for releasing the computing carriage and restoring it to its anchorage.

22. The combination with a traveling carriage, of an auxiliary carriage adapted to travel step by step therewith, a lock holding said auxiliary carriage, and a finger forming part of said first-named carriage adapted to release said lock and pick up said auxiliary carriage.

23. The combination with a traveling carriage and an auxiliary carriage, of a hook forming part of said auxiliary carriage, a pivot on which said hook is mounted, a notch adjacent said hook, and a finger on said first-mentioned carriage adapted to strike said hook to release the auxiliary carriage and to pick up said auxiliary carriage by said notch.

24. The combination with a traveling carriage and an auxiliary carriage, of a hook forming part of said auxiliary carriage, a pivot on which said hook is mounted, a notch adjacent said hook, a finger on said first-mentioned carriage adapted to strike said hook to release the auxiliary carriage and to pick up said auxiliary carriage by said notch, and means for setting said finger at an ineffective position.

25. The combination with a traveling carriage and an auxiliary carriage, of a hook forming part of said auxiliary carriage and normally locking it, a finger pivoted on said first-mentioned carriage, adapted to move said hook to ineffective position when said carriages are traveling in one direction, and a projection forming part of said hook adapted to move said finger to ineffective position when said carriages are traveling in the opposite direction.

26. The combination with a traveling carriage and an auxiliary carriage, of a hook forming part of said auxiliary carriage and normally locking it, a finger pivoted on said first-mentioned carriage, adapted to move said hook to ineffective position when said carriages are traveling in one direction, a projection forming part of said hook adapted to move said finger to ineffective position when said carriages are traveling in the opposite direction, and means for setting said finger at ineffective position.

27. The combination with a carriage and a finger thereon, of a member adapted to be caught by said finger, a hook normally holding said member but released by said finger, and a projection on said hook for moving said finger to ineffective position.

28. The combination with a carriage and a finger thereon, of a member adapted to be caught by said finger, a hook normally holding said member but released by said finger, a projection on said hook for moving said finger to ineffective position, and manual means for making said finger ineffective.

29. In a combined typewriting and computing machine, the combination of a typewriter carriage and a computing carriage, of means normally holding said computing carriage positively locked, means associated with said typewriter carriage for releasing said lock at any one of a plurality of points in the travel of said typewriter carriage to cause said carriages to travel together as a unit, and means for making said releasing means ineffective at any one of said plurality of points.

30. A computing typewriter combining a typewriter carriage, a computer carriage, a coupler for joining the computer carriage bodily to the typewriter carriage to cause the latter to carry the former during the normal advance and the normal return movements of the typewriter carriage, and a device for moving said coupler to disconnect said carriages at a predetermined point in said normal return movement.

31. A computing typewriter combining a movable computing element, a movable typewriter element, one of said elements being normally stationary during a portion of the normal travel of the other element, and automatic means for connecting said elements to move together